INVENTOR:
Ernest J. Dieterich,
BY Bair, Freeman & Molinare
ATTORNEYS.

INVENTOR:
Ernest J. Dieterich,
By Bair, Freeman & Molinare
ATTORNEYS.

United States Patent Office 2,978,679

Patented Apr. 4, 1961

2,978,679

ELECTRICAL INFORMATION PROCESSING APPARATUS

Ernest J. Dieterich, Winchester, Mass., assignor, by mesne assignments, to Minneapolis-Honeywell Regulator Company, a corporation of Delaware Filed Jan. 7, 1957, Ser. No. 632,889

17 Claims. (Cl. 340—172.5)

This invention relates generally to information processing systems and more particularly to improvements in information processing systems of the type which utilize recirculating registers in the processing of electrical information pulses.

Various types of information processing systems are known in the art in which electrical pulses representing digital data are recirculated through registers for carrying out control functions, arithmetic functions, information storage and other data handling operations. In many such systems the data is processed in the binary form of notation, i.e., in groups of time spaced bits or pulse positions in which there is an electrical pulse for each bit representing a "one" and no electrical pulse for each bit representing a "zero."

In certain information processing systems, such as electrical computing machines and the like, the binary or binary coded decimal numbers represent numeric characters or alphabetical characters or mixtures of such characters which are handled in groups by the machines. Each of these various groups of characters occupies the same amount of space in time within the machine, i.e., the same number of bits, and therefore such groups are commonly called "machine words." Thus, each machine word consists of a given number of time-spaced bits.

For example, in the type of electrical computing system disclosed in the application to Henry W. Schrimpf filed January 25, 1957, Serial No. 636,256, of common assignee, each word consists of 52 pulse positions or time-spaced bits. When a word is an order word, certain of these bits may be used to instruct the computing machine as to the nature of the operation to be performed, other bits may be used to represent a plus or minus sign, and still other bits may be used to specify the information addresses in the computing machine memory. Additionally, another group of the bits may be used for supervisory or checking purposes to insure not only that items of information are correctly transferred from place to place within the computing machine but also to check the accuracy of the operation performed upon such information. The machine described in the preceding paragraph is commonly referred to as a three address machine since certain of the order words may be arranged so that three specific segments of the word may be designated for selective data addresses or optional control information in addition to the normal supervisory information, additional operation information and sign information.

In processing a multi-bit order word, it often is advantageous to store the word in a recirculating type of register during the time the order is being performed by the system. Thus the word is read into the register, either serially or in parallel, and is recirculated through the register by means of a feedback loop. In interpreting the information carried by the word, such as a word having three addresses, it is advantageous for the machine first to read the address of the first item of information to be taken from memory, then read the address of the second item of information to be taken from the memory and after determining the operation to be performed upon these two items of information, read the address in the memory where the result of the operation is to be stored. Manifestly, read-out of these three addresses at the correct times is most efficient if each address information item is available at a single specified location in the recirculating register when its read-out cycle is reached in the major machine cycle. Also, it will be appreciated that it is highly advantageous to read out each address information item at the proper times in the machine cycle without disturbing the relative positions of the other information bearing bits in the word.

Accordingly, it is an object of this invention to provide an improved multi-address information processing system in which each address position in a machine word can be read out at different times in a machine cycle from the same location in the register storing the machine word.

It is another object of this invention to provide an information processing system having means for shifting during a single shift operation the relative positions of certain information items in a word with respect to each other without disturbing the relative position of the other information items in the word.

It is still another object of this invention to provide means for use in an electronic computer for reading out in sequential order and at a given register location selected portions of a word stored in a recirculating register.

It is a further object of this invention to provide a recirculating register for storing a word comprising a plurality of information items which has associated therewith one or more additional recirculating registers for processing selected information items in the word to shift the relative positions of the selected information items with respect to each other but not to shift the relative positions of the remaining information items in the word.

It is a still futher object of this invention to provide a recirculating register in a multi-address word type of information processing system with an address shifting circuit wherein the address portions of the word stored in the register may be shifted with respect to each other without disturbing the positions of the remaining portions of the word.

It is a still further object of this invention to provide means for attaining an internal shift of selected information items in a multi-bit word which is characterized by its relative simplicity, efficiency and reliability of operation.

With these and other objects in view the invention consists in the construction, arrangement and combination of the various parts of the novel information processing system whereby the objects contemplated are attained as heretofore set forth. The various features of novelty which characterize this invention are pointed out with particularity in the claims appended to and forming a part of this specification. For a better understanding of the invention, and its advantages, reference is had to the accompanying drawing and descriptive matter in which is illustrated and described a specific illustrative embodiment of the invention.

Figures 1, 2, 3, 4:
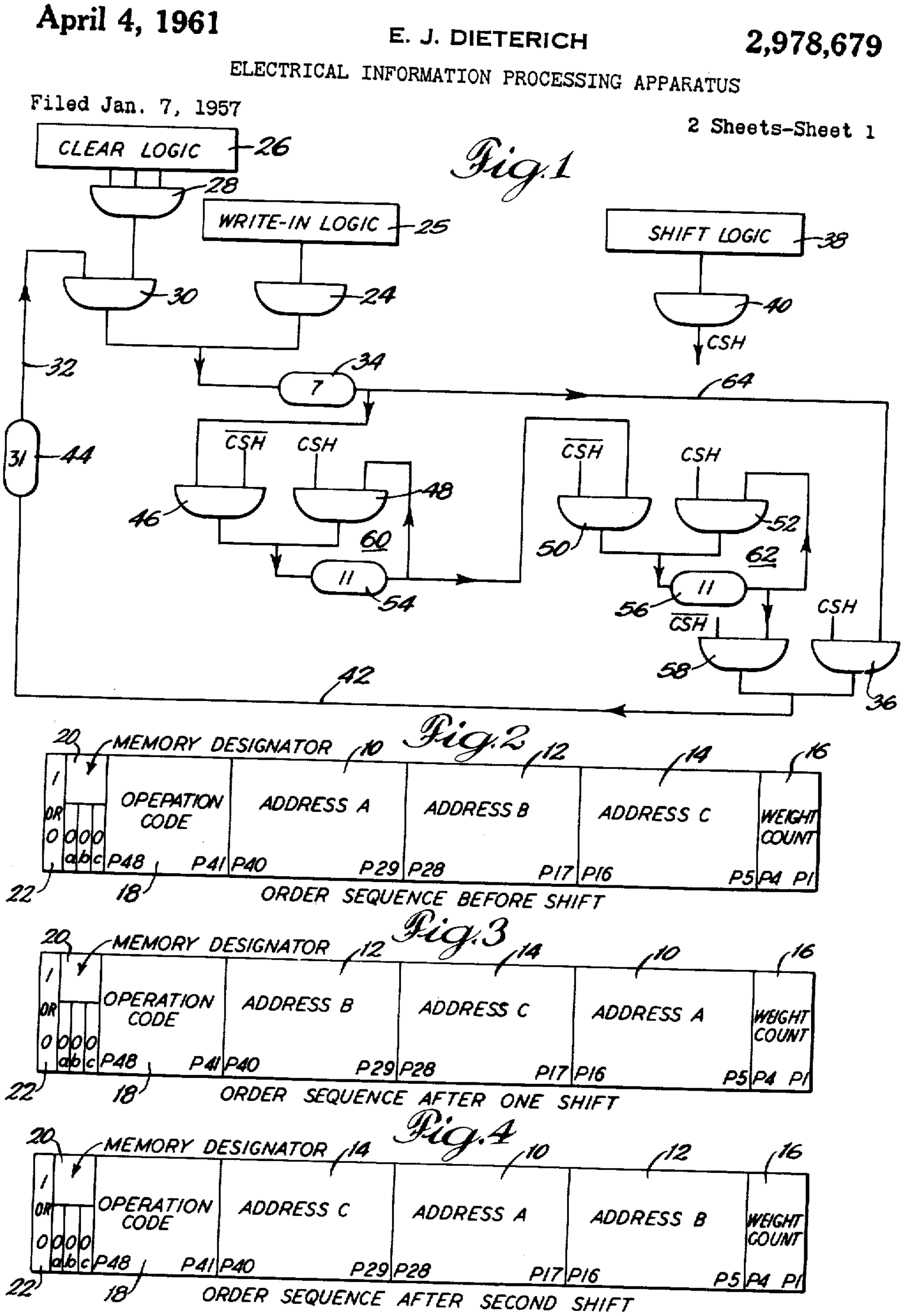
Figure 1 is a diagram in symbolic logic form of a recirculating shift register circuit embodying the invention.
Figures 2, 3 and 4 are diagrams illustrating the internal shift of address information items within a single word as attained by the circuit of Figure 1.

Referring now to the drawing, and more particularly to Figure 1, there is shown in symbolic logic form a recirculating register which advantageously may be utilized in information processing systems of the type utilizing electronic computing machines and the like. The register advantageously may be comprised of two types of packaged circuits, namely, a gating circuit package, shown as semi-oval shaped and the other a delay circuit package, shown as substantially oval shaped.

The contents of each package generally are well known and may comprise any one of the number of different gating and delay circuits which have been disclosed in the prior art. For example, the gating circuit package advantageously may be of the general type shown in the articles "Basic Gating Package for Computing Operations" by Franklin R. Dean, which appears at pages 14 et seq., Electronic Equipment, February, 1956, and "Packaged Logical Circuitry for a 4 m.c. Computer" by Norman Zimbel, which appears at pages 133 et seq., Convention Record of the I.R.E., part 4, 1954. This type of gating package comprises a plurality of multi-diode gates to which are applied the information signals and clock pulses, buffer and amplifier means, and assertion and negation outputs. It will be understood by those skilled in the art that the gating packages may be connected to operate either as a coincidence gate which provides an output signal only as a result of the coincidence of like signals upon its input diodes or as an anti-coincidence gate which provides an output signal only when there is no coincidence of like signals upon its input diodes. In accordance with conventional terminology the anti-coincidence gates are designated by an input which has a horizontal line drawn thereabove to indicate that only the negation of a signal on that input together with the assertion of signals on the other inputs will result in an output from the gate.

The delay packages may take the form of any suitable delay circuit known in the art which includes lumped inductive and capacitative elements, multivibrators, or even suitably connected gating packages of the type described above. As understood by those skilled in the art, the delay package serves to delay the information item or word for an interval of time determined by the characteristics of the delay package.

In accordance with the invention, the gating packages and delay packages of the circuit of Figure 1 are connected in a unique manner to provide a major recirculating register which has associated therewith a pair of minor recirculating registers. A recirculating register may be defined as a circuit for storing the plurality of pulse bits comprising a machine word for a given time interval and for reading the register output back into the register input to produce a continuous recirculating stream of informational pulses through the register.

To facilitate the understanding of the invention, as exemplified by the single word recirculating register shown in Figure 1, the machine word will be assumed to contain 52 bits or pulse positions, of which three groups of 12 bits each comprise the three address items in the word, one group of four bits comprise a weight count or check item in the word, one group of eight bits comprises the operation code item in the word, three groups of one bit each comprise the memory designators or thousandth digits of the three address items and one bit comprises the positive or negative sign item in the word. In the aforementioned Henry W. Schrimf application, a machine minor cycle comprises 64 pulse periods with 12 pulse periods being utilized for control purposes or the like and the remaining 52 pulse periods being available for the serial transmission of the machine word.

A word of the type just described is shown in Figure 2 of the drawing in which the bit positions 10, 12 and 14, comprising the address items A, B and C, respectively, are shown in their normal sequence with respect to each other and with respect to the information items in the remaining bits in the word.

Thus address A is positioned in pulse positions P29 to P40, address B is positioned in pulse positions P17 to P28 and address C is positioned in pulse positions P5 to P16. The supervisory or weight count information item 16 is positioned at the beginning of the word at pulse positions P1 to P4. The operation code information item 18 is positioned at pulse positions P41 to P48, the memory designator item 20 is positioned at pulse positions P49 to P51 and the sign information item 22 is positioned at the end of the word at pulse position P52.

As explained above, the recirculating register circuit shown in Figure 1 operates to shift information items 10, 12 and 14, comprising addresses A, B and C, end-around to change their sequence in the word without changing the relative positions of the other information items in the word. Manifestly this permits each address to be read out sequentially from the word at a single read out location corresponding to pulse positions P29 and P40. Advantageously this sequential read out may be accomplished on one major machine cycle which comprises several minor cycles of operation.

Thus, in the first minor cycle, the next order word to be processed is written into the recirculating register through gating packaging 24. The word may be applied to gating package 24 from any suitable source, such as a low speed magnetic tape memory, a high speed magnetic core memory or other registers, through the write-in logic network 25. If, at the time the new word is being read into the recirculating register there is an old word being recirculated therein, the old word may be cleared from the register by means of the clear logic network 26 and gating packages 28 and 30. Thus, as the old word is applied to gating package 30 from feedback conductor 32, the clear logic network 26 and gating package 28 are made operative to disable gating package 30 to render it nonconductive and thereby prevent the passage of the old word therethrough so that it does not re-enter the primary recirculating loop of the register.

During the nonshift operation of the circuit before the first shift cycle the pulses comprising the new word are read in from write-in logic network 25 and gating package 24 through a seven pulse period delay package 34 to gating package 46. The output pulses from delay package 34 also are applied to an input of gating package 36. Gating package 46 has a negation input $\overline{CSH}$ and gating package 36 has an assertion input CSH. Shift logic network 38 and gating package 40 are made operative at this time to activate gating package 46 and to disable gating package 36 so that the pulse output of delay package 34 passes through only gating package 46. The word pulses pass on through an eleven pulse period delay package 54 and into gating passage 50. The pulses are prevented from being fed back into gating package 48 of the secondary recirculating register 60 as this gating package is blocked by the absence of an assertion input CSH applied thereto.

As a negation input $\overline{CSH}$ is present at gating package 50, the word passes therethrough into an eleven pulse period delay package 56 of the secondary recirculating register 62. The output of delay package 56 is applied to gating package 52, which is disabled due to the absence of a CSH input, and is also applied to gating package 58 which is activated by the $\overline{CSH}$ input. The word then is fed into feedback conductor 42 where it passes through a 31 pulse period delay package 44 on the feedback conductor 32. The word then is ready to re-enter the primary recirculating register for reprocessing therein so long as gating package 30 is not disabled by the clear logic network 26.

It will be appreciated that during the nonshift operation the gating package having negation input $\overline{CSH}$ will be activated during the entire minor cycle and that the gating packages having a CSH input will be disabled during the entire minor cycle to permit the word to follow the above described path in the recirculating register. Thus, it can be seen that before the first shift cycle the sequence of addresses in the register is A, B and C, as shown in Figure 2, and address A may be read out of the register together with the operation code item 18, memory designator item 20, and sign item 22 from read out taps (not shown) connected to the register at positions coresponding to pulse positions P29 and P52.

During the first shift cycle shift logic network 38 and gating package 40 are made operative to produce a CSH output. This serves to block gating packages 46, 50 and 58 and to activate gating packages 48, 52 and 36. Advantageously the CSH output is applied for a time interval equal to twelve pulse periods beginning at the time the first bit of address C corresponding to pulse position P5 is leaving delay package 56, the first bit of address B corresponding to pulse position P17 is leaving delay package 54, and the first bit of address A corresponding to pulse position P29 is leaving delay package 34. This occurs because delay packages 34, 54 and 56 are each twelve bits apart, corresponding to the twelve bits in each address, due to the 11 pulse periods of delay in the delay packages and the additional pulse period of delay in the gating packages.

Thus it will be understood that during the following twelve pulse periods address C will be recirculated through gating package 52 and delay package 56 of secondary recirculating register 62 and address B will be recirculated through gating package 48 and delay package 54 of secondary recirculating register 60. Also during this twelve pulse period interval address A will be fed from nonconductor 64 through gating package 36 onto the feedback conductor 42 directly behind the weight count information item 16. At the end of this twelve pulse period interval the CSH output will be removed to permit address C from the secondary recirculating register 62 and then address B from the secondary recirculating register 60 to flow through gating package 58 onto the feedback conductor 42. Thus, an end-around shift of the address information items in the word has been accomplished without disturbing the relative pulse positions of the other information items in the word and the word now re-enters the register through gating package 30 in the form shown in Figure 3 wherein the sequence of addresses is B, C and A. Address B then may be read out of the register from the same read out taps, not shown, utilized in the reading out of address A during an earlier cycle.

The next time the CSH output is made active by shift logic network 38 and gating package 40 a similar shift will occur to change the sequence of addresses within the word to C, A, B, as shown in Figure 4. This occurs in the manner described above beginning at the time the first bit of address A corresponding to pulse position P5 is leaving delay package 56, the first bit of address C corresponding to pulse position P17 is leaving delay package 54 and the first bit of address B corresponding to pulse position P29 is leaving delay package 34. Thus, addresses A and C are recirculated in secondary registers 62 and 60, respectively, while address B is fed through gating package 36 onto feedback conductor 42. At the end of this twelve pulse period interval addresses A and C are applied in sequence to feedback conductor 42 to accomplish the desired shift. In the following cycle then address C may be read out of the register from the read out tapes previously utilized in reading out addresses A and B.

It is now understood how the novel register shown in Figure 1 accomplishes an internal shift of designated information items within a machine word containing a plurality of information items. When a word of the type shown in Figures 2, 3 and 4 is processed by the register only the main address positions are shifted. The remaining information items, weight count item 16, operation code item 18, memory designator item 20 and sign item 22 remain in their original locations in the word and are not disturbed by the end-around shift of the address information items. It will be appreciated that shifting address items A, B and C introduces no weight count problem since each bit is in the same relative weight position as it originally appeared. Thus, in the binary coded decimal form of notation, four bits are used to define a decimal number and these four bits are valued 8, 4, 2 and 1. Since the weight count is based on an 8, 4, 2, 1 code, any shifting of data in the machine word must be done without changing the relative weight positions of the bits in the word. This is met by the present shifting circuitry. A more exacting treatise of weight counts in computed logic will be found in the patent of Richard M. Bloch, 2,634,052, issued April 7, 1953.

Figure 5:
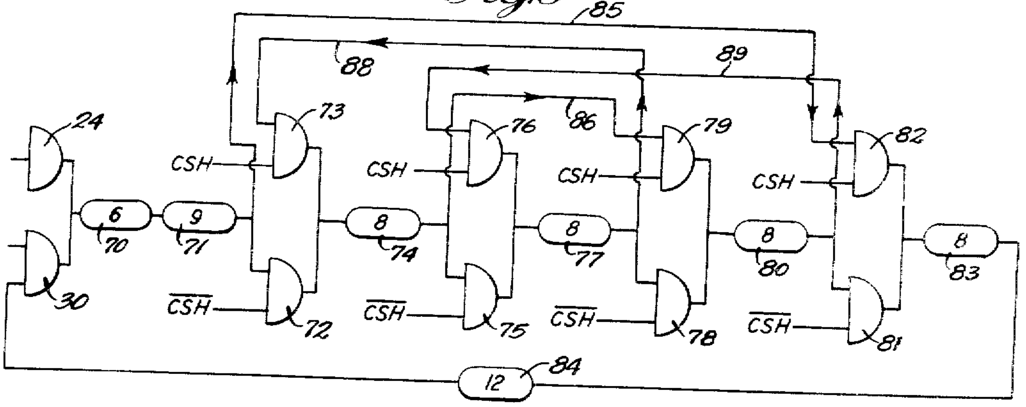
Figure 5 is a diagrammatic representation of a modified form of register for shifting data embodying the principles of the present invention.

Figure 5 illustrates a diagrammatic shift circuit wherein the end-around shift described in conjunction with Figure 1 has been extended to the shifting of a larger amount of data in the register and with the intermingling of the shifted data, without changing the overall relative position of the data and without disturbing selected portions of the data in the register.

Considering Figure 5 more specifically, components corresponding to the components of Figure 1 carry corresponding reference numerals. The write-in logic connected to the gate 24 is arranged to feed a pair of delay lines 70 and 71, which incorporate 6 and 9 pulse periods of delay, respectively. The output of the delay line 71 is connected to the input of a gating section 72, the latter of which has its output buffered together with a further gating section 73 to an input of a delay line 74 having 8 pulse periods of delay. The output of the delay line 74 in turn is connected to the input of a gating section 75. The gating section 75 is buffered together on its output with a further gating section 76. The gating sections 75 and 76 in turn feed into a delay line 77 having 8 pulse periods of delay therein.

The output of the delay line 77 is connected to a further gating section 78 and also back to the gating section 73. The gating section 78 is buffered together with a further gating section 79 to supply an input signal to a further delay line 80 having 8 pulse periods of delay therein. The output of the delay line 80 is in turn connected to a further gating section 81 and to a feedback line connected to the gating section 76. The gating section 81 is buffered together with a further gating section 82 to supply an input signal to a delay line 83 having 8 pulse periods of delay. The output of the delay line 83 feeds back through a further delay network 84 having 12 pulse periods of delay to the recirculation gate 30.

When no shift is desired in the register illustrated in Figure 5, the $\overline{CSH}$ lines will be active to open the gates 72, 75, 78, and 81, respectively. When a shift is desired, the CSH lines on the gates 73, 76, 79, and 82 will be active. Considering first the operation when no shifting is taking place, the normal data flow in the register will be from the input either by way of input gate 24 or recirculation gate 30 through delay lines 70 and 71 to gate 72, delay line 74, gate 75, delay line 77, gate 78, delay line 80, gate 81, delay line 83, and the feedback delay line 87 to the recirculation gate 30.

Figure 6:
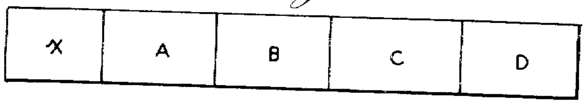
Figures 6 and 7 are diagrams illustrating the internal shift which may be achieved by the circuit of Figure 5.

Figure 6 represents data which may be utilized in the register of Figure 5. In this example, the machine word is divided into a plurality of portions designated X—A—B—C—D. Each of the portions A, B, C and D advantageously are 9 pulse periods in length, in which the portion X may be the remaining bits in the information word on which no shift is to take place.

If the data illustrated in Figure 6 is inserted into the register illustrated in Figure 5 and no shift takes place, the data will continue to circulate in the register and remain in the form in which it is illustrated in Figure 6. In the form of the data illustrated in Figure 6, it is assumed that the data to be shifted is represented by the letters A, B, C, and D and the data represented by the letter X is not to be shifted but is to remain in its basic position relative to the overall machine word represented. Thus, the data when recirculated in the register without shifting will remain in the order X, A, B, C, D.

Figure 7:
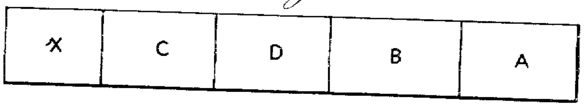

Figure 7 illustrates the desired arrangement of the data after a shift has taken place in the register. It will be noted from this figure that the data should, after a shift, take the form X, C, D, B, A. When the data is inserted in the register, it will be inserted in the form shown in Figure 6. At the instant that a shift signal CSH is applied to produce the shift shown in Figure 7, the X portion of the data will be residing in the delay line 70 and the circuitry prior thereto; the A portion in the delay line 71, the B portion will be residing in the gate 72 and delay line 74, the C portion will be residing in the gate 75 and delay line 77; and the D portion will be residing in the gate 78 and the delay line 80.

Upon the occurrence of the shift signal CSH, the gate 72 will be closed and the A portion of the data in the delay line 71 will be by-passed by way of the by-pass line 85 into the gate 82 and thence into the delay line 83. Thus the A portion of the data has been advanced in time to the position shown in Figure 7. The B portion of the data in the register is arranged to be advanced in time by taking the output of the delay line 74 and feeding it through by-pass line 86 to the gate 79. The B portion of the data will then reside in the position shown in Figure 7. The C portion of the data is arranged to be shifted backwards in its relative position in the word and this is accomplished by taking the output of the delay line 77 and feeding it back through feedback line 88 to the gate 73. Similarly, the D portion of the data is fed back from the output of the delay line 80 through feedback line 89 to the gate 76.

By appropriately limiting the shift signals CSH to 9 pulse periods, the assumed length of each of the data items, it is possible to effect the shift in the manner shown so that the data will now take the form shown in Figure 7.

It will be apparent from considering Figure 5 that the amount of internal shifting that can be achieved is determined by the number of recirculating loops and by-pass loops that are provided in the register circuit and it will be clear to those skilled in the art that these principles may be expanded or contracted to meet the needs of any particular shift problem.

Figure 8:
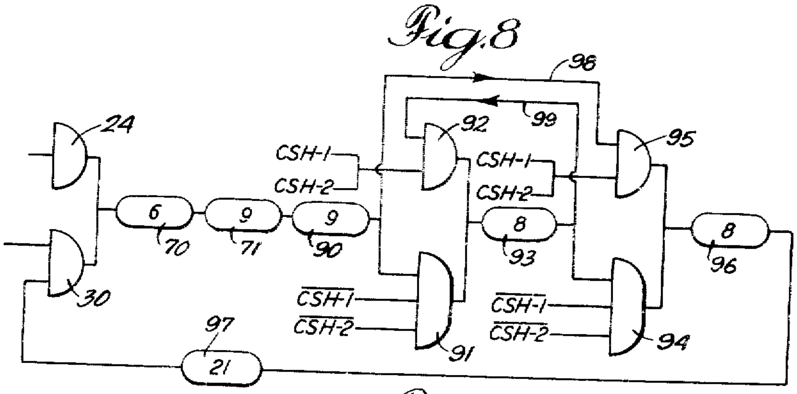
Figure 8 shows a further modified form of the present invention wherein the shifting is accomplished on a time sharing basis of the shifting circuits.

Figure 8 illustrates a modified form of shifting circuit wherein the data in a single word may be shifted on a time sharing basis. More specifically, the register illustrated in Figure 8 incorporates a single recirculation loop and a single by-pass loop with the gating circuits associated therewith being adapted to be activated for shifting during two specific time periods during the transfer of a particular machine word through the register.

In Figure 8, the input gate 24 and the recirculation gate 30 are buffered together to feed the delay line 70 and delay line 71 connected in series. The delay line 71 in turn is connected in series with the delay line 90, the latter of which has an output connected to a gating circuit 91. Gating circuit 91 has two input gate legs activated by the signals $\overline{CSH-1}$ and $\overline{CSH-2}$. The gate 91 is buffered together with the output of a further gating section 92 and connected to the input of a delay line 93. The output of the delay line 93 is arranged to feed into a further gating section 94, the latter also having a pair of input gate legs controlled by the signals $\overline{CSH-1}$ and $\overline{CSH-2}$. Gating section 94 is buffered together with a further gating section 95 to the input of a delay line 96, the latter of which is connected by way of a feedback delay line 97 to the recirculation gate 30.

A pair of signals CSH-1 and CSH-2 are buffered together on an input gate leg of each of the shifting gate circuits 92 and 95. These latter shift signals are arranged, in the present example, to occur at different time intervals so that the C and D information may be shifted end-around with respect to each other and the A and B information may be shifted end-around with respect to each other in the form illustrated in Figure 9. As each of the data groups is assumed to be 9 pulse periods in length, the shift pulses CSH-1 and CSH-2 will each have to be 9 pulse periods in length and are spaced 9 pulse periods apart.

Considering the operation of Figure 8 more specifically, the data inserted into the register is assumed to take the form shown in Figure 6. When there is no shift signal present in the circuit, that is the signals $\overline{CSH-1}$ and $\overline{CSH-2}$ are active, the data will pass into the register by way of the gating circuit 24 through the delay lines 70, 71 and 90, the gating section 91, the delay line 93, the gate section 94, the delay line 96, and the feedback delay line 97 into the recirculation gate 30. The data will, under this assumed operation, remain in the form shown in Figure 6.

Figure 9:
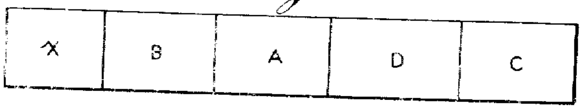
Figure 9 illustrates how data may be shifted in the diagrammatic circuit illustrated in Figure 8.

When it is desired to shift the data to the form shown in Figure 9, the data will be moved into the register and when the D portion resides in the gate 91 and delay line 93, and the C portion resides in delay line 90, the shift signal CSH-1 will become active to open the gates 92 and 95 and close the gates 91 and 94. Thus the C portion of the data in the delay line 90 will be by-passed by way of the by-pass line 98 through the gating section 95. The D portion of the data in the delay line 93 will be fed back through feedback line 92 to the gating section 92. Thus, the D and C portions of the data will be shifted relative to each other to the form shown in Figure 9. However, after the first shift, the A and B portions of the data will still be in the form shown in Figure 6.

In order to shift the A and B portions of the data it is necessary to permit the data to continue to move into the register so that the B portion of the data resides in the gate 91 and the delay line 93 and the A portion of the data resides in the delay line 90. The transfer which moves the data into the last mentioned circuits requires 9 pulse periods and when completed the shift pulse CSH-2 may be applied. This CSH-2 signal will be effective to again close the gates 91 and 94 and open the gates 92 and 95 to thereby cause the B portion of the data to be by-passed by way of the delay line 98 to the gate 95. At the conclusion of the shift, the data will then be arranged with the A and B portions of the data reversed in the register as illustrated in Figure 9. Since the shift signal has now stopped, the X portion of the data will remain in its relative position with respect to the other data in the machine word and will not be distributed.

It will be readily apparent that the principles illustrated in Figure 8 may be applied to shift circuits of the type shown in Figure 5 or in Figure 1. Further, the advantages achieved by the circuit illustrated in Figure 1 are equally applicable to a circuit of the type illustrated in Figure 8.

While there has been shown and described particular embodiments of this invention, it will be obvious to those skilled in the art that various changes and modifications may be made therein without departing from the invention and, therefore, it is intended in the appended claims to cover all such changes and modifications as fall within the true spirit and scope of the invention.

What is claimed as the present invention is:

1. In an information processing system including recirculating register means for processing words of the type having a plurality of information items in each word, the combination comprising a primary recirculation closed loop including gating and delay networks for enabling a word to be recirculated around said closed loop, logic gating means for applying a new word to be processed to said closed loop, logic gating means for clearing an old word from said loop, and shift means for shifting the positions within said word of selected information items with respect to each other and at the same time maintaining the positions of the remaining information items in said word thereby to facilitate the read-out of said selected information items, said shift means comprising a pair of secondary recirculation closed loops in circuit with said primary recirculation closed loop, and gating means connected to said pair of secondary recirculation closed loops for recirculating in the secondary closed loops at selected time intervals predetermined ones of said selected information items to produce a shift in the positions of the latter with respect to each other.

2. In an information processing system including recircuiting register means for processing information words of the type having a plurality of information items in each word, the combination comprising a primary closed loop recirculating register, gating means for writing a word to be processed into said register, and shift means for producing successive end-around shifts of selected information items in said word without changing the relative positions of the remaining information items in said word comprising at least one secondary closed loop recirculating register connected in circuit with said primary closed loop recirculating register, and gating means connected to said secondary closed loop recirculating register for recirculating therein predetermined ones of said selected information items to produce an end-around shift in the positions of said selected information items in said word.

3. Recirculating register means for processing a multibit information word of the type including a plurality of bit positions for A, B, and C information items and a plurality of bit positions for various other information items which comprises, in combination, a closed loop primary register including gating and delay means for enabling said information word to be recirculated and a pair of closed loop secondary registers connected to said primary register for enabling said A, B, and C information items to be selectively shifted with respect to each other and at the same time maintaining the bit positions of said various other information items in position relative to said A, B, and C information items.

4. Recirculating register means in accordance with claim 3 further comprising gating means in circuit with one secondary register for enabling selected ones of said A, B, or C information items to be recirculated in said one secondary register and gating means in circuit with the other secondary register for enabling selected ones of A, B, or C information items to be recirculated in said other secondary register.

5. Recirculating register means in accordance with claim 4 further comprising a source of shift pulses connected to the gating means in said primary and secondary registers for enabling said information word to be recirculated with no shift to maintain an ABC information item sequence, to be recirculated with one shift to have a BCA information item sequence, and to be recirculated with two shifts to have a CAB information item sequence.

6. Recirculating register means for processing a multibit information word of the type including a plurality of bit positions for A, B, and C information items and a plurality of bit positions for various other information items which comprises in combination a closed loop primary register including gating and delay means for enabling said information word to be recirculated, gating means for selectively writing an information word into said primary register, gating means for selectively clearing an information word out of said primary register, and a pair of closed loop secondary registers, each including gating and delay means in circuit with said primary register for enabling said A, B, and C information items to be selectively shifted from an ABC sequence to a BCA sequence and then to a CAB sequence while maintaining said various other information items in their original positions in the word relative to said A, B, and C information items.

7. Recirculating register means adapted to process a multi-bit information word of the type having bit positions for a plurality of information items which comprises a closed loop primary recirculating register including gating and delay means for processing said multi-bit information word, logic circuit means for writing said multi-bit information word into said primary recirculating register during a selected time interval and for clearing said multi-bit information word during a selected time interval, a pair of closed loop secondary recirculating registers, gating means connecting said secondary recirculating registers in circuit with said primary recirculating register and with each other and adapted to enable selected information items to be read out of said information word and to be subsequently rewritten therein in a diffierent sequence, and a source of gating signals connected to said gating means for rendering said gating means operative during predetermined time intervals to change the sequence of said selected information items.

8. Recirculating register means adapted to process a multi-bit information word of the type having bit positions for a plurality of information items which comprises a closed loop primary recirculating register including gating and delay means for processing said multi-bit information word, a pair of closed loop secondary recirculating registers, gating means connecting said secondary recirculating registers in circuit with said primary recirculating register and with each other and adapted to enable selected information items to be read out of said information word and to be subsequently rewritten therein in a different sequence, and a source of gating signals connected to said gating means for rendering said gating means operative during predetermined time intervals to change the sequence of said selected information items.

9. Recirculating register means for a three address information processing system adapted to process multi-bit information words having bit positions for three memory addresses and for various control information items comprising a closed loop primary recirculating register including gating and delay means for processing each multi-bit information word, a pair of closed loop secondary recirculating registers, and gating means connecting said secondary recirculating registers in circuit with said primary recirculating register and with each other and adapted to enable selected ones of said addresses to be read out of said information word and to be subsequently rewritten therein in a different sequence, while at the same time maintaining said control information items in their original bit positions in said information word.

10. Recirculating register means for a three address information processing system in accordance with claim 9 wherein said gating means is connected to a source of gating signals for rendering said gating means operative during predetermined time intervals to change the sequence of said three memory addresses.

11. Recirculating register means for processing a multi-bit information word of the type having bit positions for information items at the beginning and end portions of the word and bit positions for information items at an intermediate portion of the word comprising a primary recirculating register adapted to process said multi-bit information word, input means for writing said multi-bit information word into said primary recirculating register, clearing means for clearing said multi-bit information word from said primary recirculation register, said clearing means having gating means connected in circuit with said primary recirculating register and adapted to be activated to block said multi-bit information word from recirculating therein, a pair of secondary recirculating registers connected in circuit with said primary recirculating register, said second recirculating registers having gating means adapted when activated to enable selected information items in said multi-bit information word to be recirculated in said secondary recirculating registers, and a source of activating pulses connected to said last named gating means for activating the latter at selected time intervals to enable the sequence of the information items at the intermediate portion of the information word to be varied in accordance with a predetermined pattern and simultaneously to maintain the information items at the beginning and end portions of the information word at their original bit positions.

12. Recirculating register means for processing a multi-bit information word of the type having bit positions for information items at the beginning and end portions of the word and bit positions for information items at an intermediate portion of the word comprising a primary recirculating register adapted to process said multi-bit information word, a pair of secondary recirculating registers connected in circuit with said primary recirculating register, said second recirculating registers having gating means adapted when activated to enable selected information items in said multi-bit information word to be recirculated in said secondary recirculating registers, and a source of activating pulses connected to said gating means for activating the latter at selected time itnervals to enable the sequence of the information items at the intermediate portion of the information word to be varied in accordance with a predetermined pattern and simultaneously to maintain the information items at the beginning and end portions of the information word at their original bit positions.

13. Recirculating register means for processing a multi-bit information word of the type having bit positions for control information items at the beginning and end portions of the word and bit positions for address information items at an intermediate portion of the word comprising a primary recirculating register adapted to process said multi-bit information word, a pair of secondary recirculating registers connected in circuit with said primary recirculating register, said second recirculating registers having gating means adapted when activated to enable selected ones of said address information items to be recirculated in said secondary recirculating registers, and a source of activating pulses adapted to activate said gating means at selected time intervals to enable the sequence of said address information items to be varied in accordance with a predetermined pattern and simultaneously to maintain the control information items at their original bit positions.

14. Apparatus for shifting digital data in a serial storage register comprising a plurality of gating circuits connected to and spaced along the length of said storage register, a plurality of taps spaced along the length of said register, circuit means connecting selected ones of said taps to selected gating circuits to transfer data through said register without shifting, and further circuit means connecting selected ones of said taps to selected gating circuits to by-pass portions of said register and recirculate data through portions of said register so that portions of the data may be shifted in its relative position in said register without shifting the overall relative position of the data in said register.

15. Apparatus for shifting digital data comprising a serial register into which digital data may be transferred, a pair of overlapping feedback circuits connected to said serial register ad adapted to be selectively gated for shifting portions of the data in said register to a less advanced position with respect to the data in said register, and a pair of by-pass circuits connected to said register and adapted to be selectively gated for shifting other portions of the data in said register to a more advanced position with respect to the data in said register.

16. Apparatus for shifting digital data in a serial storage register comprising a minor closed loop serial recirculating register connected to said storage register, circuit means connected to by-pass said minor closed loop register, signal gating circuit means connected to said by-pass circuit means and said minor loop register to effect a shift of the information in said storage register, and timing means connected to said gating means to selectively shift internal portions of the data in said register without changing the overall relative position of the data in said register.

17. Apparatus as defined in claim 16 wherein said timing means is activated more than once for each group of digital data to effect more than one internal shift of the data.

References Cited in the file of this patent

UNITED STATES PATENTS

| | | |
|---|---|---|
| 2,674,733 | Robbins | Apr. 6, 1954 |
| 2,701,095 | Stibitz | Feb. 1, 1955 |
| 2,807,002 | Cherin | Sept. 17, 1957 |
| 2,866,177 | Steele | Dec. 23, 1958 |
| 2,907,003 | Hobbs | Sept. 29, 1959 |
| 2,911,622 | Ayres | Nov. 3, 1959 |